United States Patent
Sakai et al.

(10) Patent No.: US 12,555,863 B2
(45) Date of Patent: Feb. 17, 2026

(54) BATTERY STACK

(71) Applicants: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

(72) Inventors: Ryotaro Sakai, Toyohashi (JP); Takaaki Izumoto, Toyohashi (JP)

(73) Assignees: TOYOTA BATTERY CO., LTD., Kosai (JP); TOYOTA JIDOSHA KABUSHIKI KAISHA, Toyota (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 584 days.

(21) Appl. No.: 17/972,474

(22) Filed: Oct. 24, 2022

(65) Prior Publication Data
US 2023/0131335 A1    Apr. 27, 2023

(30) Foreign Application Priority Data
Oct. 27, 2021  (JP) ................................ 2021-175741

(51) Int. Cl.
*H01M 10/04*  (2006.01)
*H01M 50/209*  (2021.01)
*H01M 50/267*  (2021.01)

(52) U.S. Cl.
CPC ..... *H01M 50/267* (2021.01); *H01M 10/0431* (2013.01); *H01M 50/209* (2021.01)

(58) Field of Classification Search
CPC .......... H01M 50/267; H01M 10/0431; H01M 50/209; H01M 10/0566; H01M 10/0587; H01M 10/617; H01M 10/0525; H01M 50/264; H01M 50/26; H01M 10/613; Y02E 60/10; Y02P 70/50
See application file for complete search history.

(56) References Cited

U.S. PATENT DOCUMENTS

2014/0157584 A1 * 6/2014 Park ................. H01M 10/0472
                                                                    29/428
2016/0155995 A1   6/2016 Takahata

FOREIGN PATENT DOCUMENTS

JP    2000231911 A    8/2000
JP    2015-022833 A   2/2015

OTHER PUBLICATIONS

Japanese Office Action issued in corresponding application No. 2021-175741, dated Oct. 31, 2023.

* cited by examiner

*Primary Examiner* — Lisa S Park
(74) *Attorney, Agent, or Firm* — Maschoff Brennan

(57) ABSTRACT

A battery stack includes cells that are arranged in a row and bound together. Each of the cells includes a case and an electrode body accommodated in the case. The cells include multiple types of position variation cells, in which positions of electrode bodies of the cells are different from each other when the cells are viewed in an arrangement direction of the cells.

9 Claims, 6 Drawing Sheets

BATTERY STACK

BACKGROUND

1. Field

The present disclosure relates to a battery stack.

2. Description of Related Art

Heat management has been an issue for conventional battery assemblies such as battery stacks, which include cells arranged in a row and bound together. For example, Japanese Laid-Open Patent Publication No. 2000-231911 discloses a battery assembly in which cells having a relatively great charging capacity are arranged in peripheral regions, where the temperature of the cells are lowered easily. This reduces power reduction due to temperature difference between the cells of the battery assembly.

However, such issues related to heat generation tend to become increasingly significant as the performances of batteries are improved. The configuration of the above-described technique is therefore not necessarily sufficient to meet the evolving needs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery stack includes cells. The cells are arranged in a row and bound together. Each of the cells includes a case and an electrode body accommodated in the case. The cells include multiple types of position variation cells, in which positions of electrode bodies of the cells are different from each other when the cells are viewed in an arrangement direction of the cells.

The above-described battery stack may include a dissimilarity zone, in which each adjacent two of the cells in the arrangement direction are different types of the position variation cells.

In the above-described battery stack, when an entire arrangement of the cells is divided into an end zone and a central zone, the dissimilarity zone may be provided in the central zone.

In the above-described battery stack, the cells may include multiple types of space-occupancy variation cells of which space occupancies of the electrode bodies in the cases are different from each other.

In the above-described battery stack, an entire arrangement of the cells may be divided into an end zone and a central zone. The cells in the central zone may have a configuration of the space-occupancy variation cells, which have lower space occupancies than the cells arranged in the end zone.

In the above-described battery stack, the position variation cells may include at least one of an upward-offset cell, in which the electrode body is offset to an upper portion of the case, and a downward-offset cell, in which the electrode body is offset to a lower portion of the case.

In the above-described battery stack, the position variation cells may include a middle-position cell. The electrode body of the middle-position cell may be arranged at a middle position. The middle position may be at a middle between an upper position, at which the electrode body of the upward-offset cell is arranged, and a lower position, at which the electrode body of the downward-offset cell is arranged.

In the above-described battery stack, when an entire arrangement of the cells is divided into an end zone and a central zone, the middle-position cell may be arranged in the end zone, and at least one of the upward-offset cell and the downward-offset cell may be arranged in the central zone.

The above-described battery stack may include an alternation zone, in which the upward-offset cell and the downward-offset cell are arranged alternately.

In the above-described battery stack, the cases of the cells may have a common shape.

In the above-described battery stack, the electrode body may include a configuration of a rolled body. The rolled body may be formed by rolling positive and negative electrode sheets, which are stacked together with a separator between the positive and negative electrode sheets.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A battery stack 51 according to a first embodiment will now be described with reference to the drawings.

Figure 1:
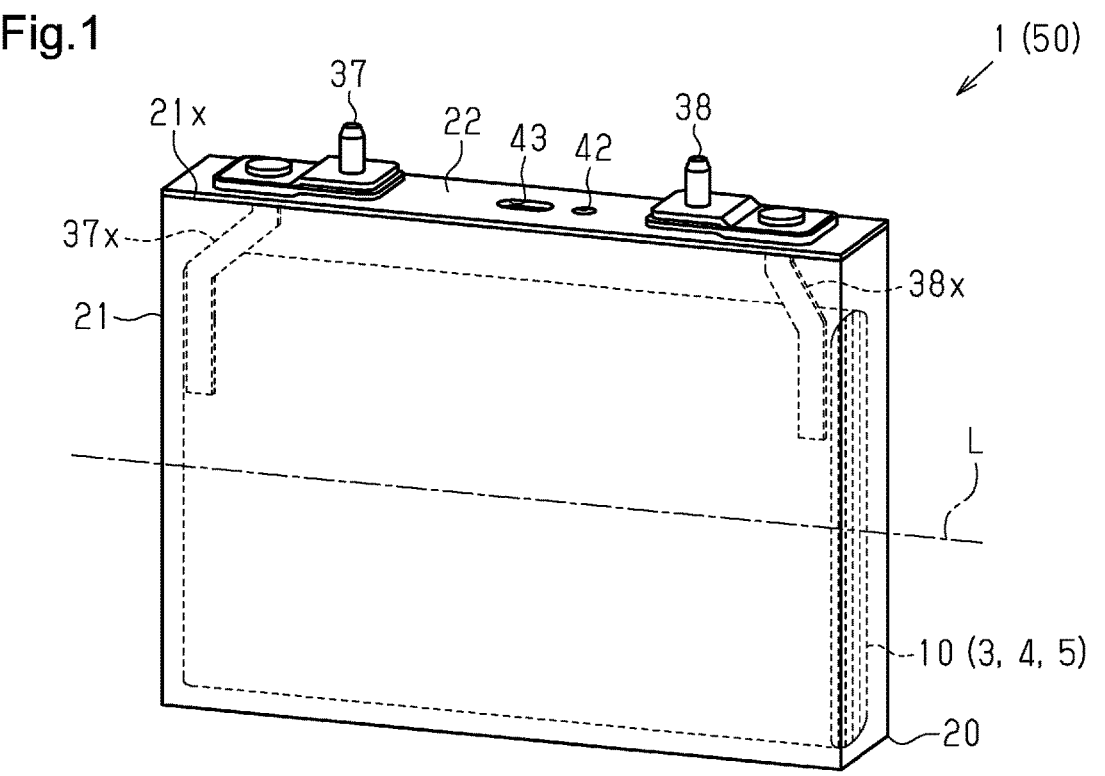
FIG. 1 is a perspective view of a cell.

As shown in FIG. 1, a rechargeable battery 1 includes an electrode body 10 and a case 20, which accommodates the electrode body 10. The electrode body 10 is formed by integrating a positive electrode 3, a negative electrode 4, and separators 5. The rechargeable battery 1 of the present embodiment has a configuration of a lithium-ion rechargeable battery, in which the electrode body 10 in the case 20 is impregnated with a non-aqueous electrolyte solution (not shown).

Specifically, the positive electrode 3, the negative electrode 4, and the separators 5 in the rechargeable battery 1 of the present embodiment have outer shapes of sheets and are stacked together. The stack body of the positive electrode 3, the negative electrode 4, and the separator 5 is rolled to form the electrode body 10, in which the positive electrode 3, the negative electrode 4, and the separator 5 are arranged alternately in the radial direction with the separator 5 sandwiched between the positive electrode 3 and the negative electrode 4.

The case 20 of the present embodiment includes a case body 21, which has the shape of a flattened rectangular box, and a lid member 22, which closes an open end 21x of the case body 21. The electrode body 10 of the present embodiment is pressed from the outside in the radial direction so as to have a flattened outer shape in correspondence with the box-shape of the case 20.

Figure 2:
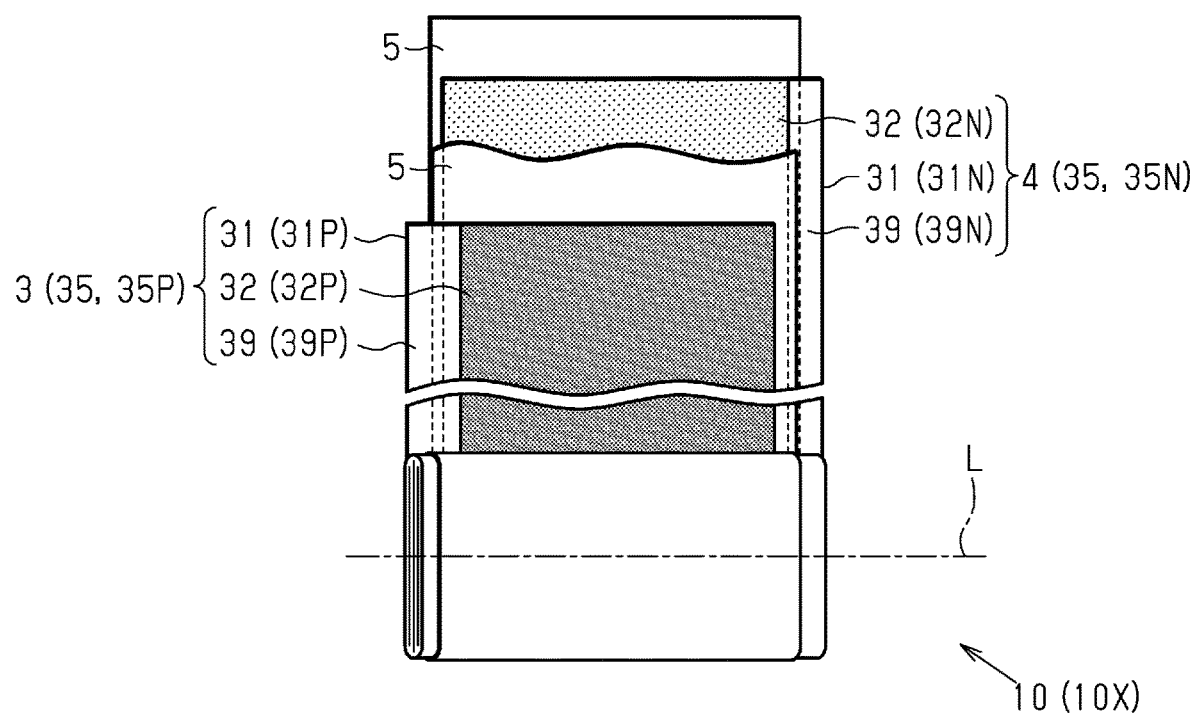
FIG. 2 is an exploded view of an electrode body.

With reference to FIG. 2, the positive electrode 3 and the negative electrode 4 in the rechargeable battery 1 of the present embodiment each have a configuration of an electrode sheet 35. The electrode sheet 35 includes a sheet-shaped current collector 31 and an electrode active material layer 32 stacked on the current collector 31.

Specifically, an electrode sheet 35P for the positive electrode 3, which includes a positive electrode active material layer 32P, by applying slurry to a positive current collector 31P. The slurry contains lithium transition metal oxide, which is a positive electrode active material. The positive current collector 31P is made of, for example, aluminum. Also, an electrode sheet 35N for the negative electrode 4, which includes a negative electrode active material layer 32N, by applying slurry to a negative current collector 31N. The slurry contains a carbon-based material, which is a negative electrode active material. The negative current collector 31N is made of, for example, copper. The positive and negative electrode sheets 35P, 35N are formed to have shapes of bands in the rechargeable battery 1 of the present embodiment. The electrode body 10 of the present embodiment has a configuration of a rolled body 10X, in which the positive and negative electrode sheets 35P, 35N, which are stacked together with the separator 5 between them, are rolled about a rolling axis L extending in a width direction of the band shape (lateral direction as viewed in FIG. 2).

In FIG. 2, the separators 5 and the electrode sheets 35 are rolled with the electrode sheet 35P, which forms the positive electrode 3, being wrapped inside. FIG. 2 merely illustrates an example of the configuration of the electrode body 10, and the separators 5 and the electrode sheets 35 may be rolled with the electrode sheet 35N, which forms the negative electrode 4, being wrapped inside. This determines whether the electrode sheet 35 that is arranged at the outermost layer of the electrode body 10 is the electrode sheet 35P, which forms the positive electrode 3, or the electrode sheet 35N, which forms the negative electrode 4.

As shown in FIG. 1, the case 20 includes a positive terminal 37 and a negative terminal 38, which protrude outward from the lid member 22 of the case 20. Further, as shown in FIG. 2, each electrode sheet 35 includes an uncoated portion 39 on the current collector 31, on which the electrode active material layer 32 is not formed. The rechargeable battery 1 of the present embodiment is configured such that the uncoated portions 39 are used to electrically connect the electrode sheet 35P, which forms the positive electrode 3, to the positive terminal 37, and to electrically connect the electrode sheet 35N, which forms the negative electrode 4, to the negative terminal 38.

Specifically, as shown in FIGS. 1 and 2, the electrode body 10 of the present embodiment is accommodated in the case body 21 such that the rolling axis L extends along the longitudinal direction (lateral direction as viewed in FIG. 1) of the lid member 22, which has the shape of an elongated rectangular plate. The electrode body 10 includes, at one end of the rolling axis L (left end as viewed in FIG. 2), an uncoated portion 39P of the electrode sheet 35P, which forms the positive electrode 3. The electrode body 10 also includes, at the other end (right end as viewed in FIG. 2), an uncoated portion 39N of the electrode sheet 35N, which forms the negative electrode 4.

In the rechargeable battery 1 of the present embodiment, the uncoated portion 39P of the electrode sheet 35P, which forms the positive electrode 3, is connected to the positive terminal 37 by a connecting member 37x in this state. The uncoated portion 39N of the electrode sheet 35N, which forms the negative electrode 4, is connected to the negative terminal 38 by a connecting member 38x. Accordingly, the rechargeable battery 1 of the present embodiment is configured to encapsulate the electrode body 10 in the case 20 with the positive electrode 3 being electrically connected to the positive terminal 37, and the negative electrode 4 being electrically connected to the negative terminal 38.

The case body 21 and the lid member 22 of the rechargeable battery 1 of the present embodiment are made of metal such as an aluminum alloy or stainless steel. The case body 21 and the lid member 22 are joined to each other in a liquid-tight manner, for example, by laser welding.

Figure 3:
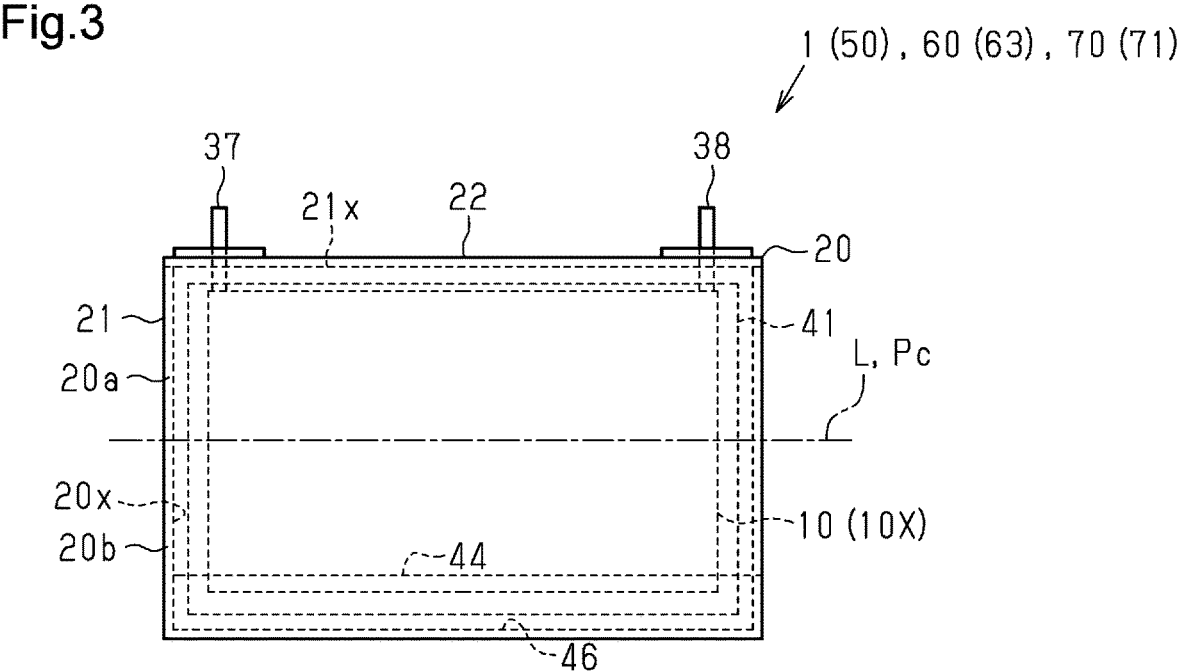
FIG. 3 is a schematic diagram showing a configuration of the cell.

As shown in FIG. 3, the rechargeable battery 1 includes an insulating film 41, which is accommodated in the case 20 together with the electrode body 10. The insulating film 41 is accommodated in the case 20 and has the shape of a bag with an opening facing the open end 21x of the case body 21. The rechargeable battery 1 of the present embodiment is configured such that the electrode body 10 is arranged in the bag-shaped insulating film 41, so that the electrode body 10 and the case 20 are insulated from each other.

Further, as shown in FIG. 1, the rechargeable battery 1 of the present embodiment includes an inlet 42 formed in the lid member 22. Electrolyte solution is poured into the case 20 through the inlet 42. The electrolyte solution used in the rechargeable battery 1, which is a lithium-ion rechargeable battery, is prepared by dissolving lithium salt, which serves as supporting salt, in organic solvent. The rechargeable battery 1 of the present embodiment is configured such that the electrode body 10, which is encapsulated in the case 20, is impregnated with the electrolyte solution.

In the rechargeable battery 1 of the present embodiment, the inlet 42 is located in the vicinity of a safety valve 43, which is located substantially at the center in the longitudinal direction of the lid member 22, which has the shape of an elongated rectangular plate. The rechargeable battery 1 of the present embodiment is configured such that the inlet 42 is sealed, for example, by laser welding after the electrolyte solution is injected.

As shown in FIG. 3, surplus electrolyte solution 44 is poured into the case 20 in addition to a certain amount of electrolyte solution held by the electrode body 10 through impregnation. The rechargeable battery 1 of the present embodiment is configured such that the surplus electrolyte solution 44 remains in a bottom portion 46 of the case 20.

As described above, each constituent unit of the rechargeable battery 1 of the present embodiment, or a cell 50, is formed by encapsulating the electrode body 10 and the electrolyte solution in the case 20. The rechargeable battery 1 of the present embodiment includes multiple cells 50 combined together. This configuration enhances the charge-discharge capacity and the output voltage of the rechargeable battery 1 of the present embodiment, which used as a power supply, for example, of an electric vehicle.

Battery Stack

A battery stack formed by the rechargeable battery 1 of the present embodiment will now be described.

Figure 4:
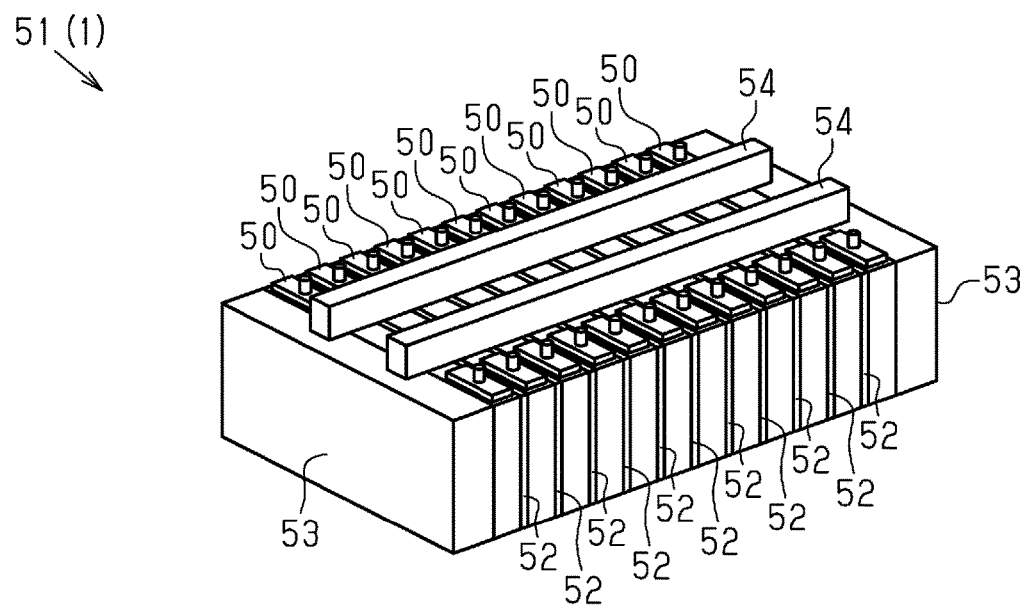
FIG. 4 is a perspective view of a battery stack.

As shown in FIG. 4, the rechargeable battery 1 of the present embodiment forms a battery stack 51, which is a battery assembly including a row of cells 50 bound together.

Specifically, the battery stack 51 of the present embodiment includes a predetermined number of the cells 50. For illustrative purposes, the number of the cells 50 in the battery stack 51 illustrated in FIG. 4 and other drawings are less than the actual number. In the battery stack 51 of the present embodiment, the cases 20 of the predetermined number of the cells 50 have a common shape. Specifically, the cases 20 of the predetermined number of the cells 50 have the shapes of flattened rectangular boxes with identical dimensions. The battery stack 51 of the present embodiment has a configuration in which the predetermined number of the cells 50 are arranged in the thickness direction of the cases 20, which have the shapes of flattened rectangular boxes (the direction orthogonal to the sheet surface of FIG. 3).

The battery stack 51 of the present embodiment includes spacers 52, each of which is placed between adjacent two of the predetermined number of the cells 50. The battery stack 51 also includes two end plates 53, 53, which are arranged at opposite ends in the arrangement direction of the predetermined number of the cells 50. The battery stack 51 further includes binding members 54, 54, which extend between the end plates 53, 53. In the battery stack 51 of the present embodiment, the binding force of the binding members 54, 54 integrates the predetermined number of the cells 50, which are arranged in a row, between the end plates 53, 53, which are provided at the opposite ends in the arrangement direction of the predetermined number of the cells 50.

Figure 5:
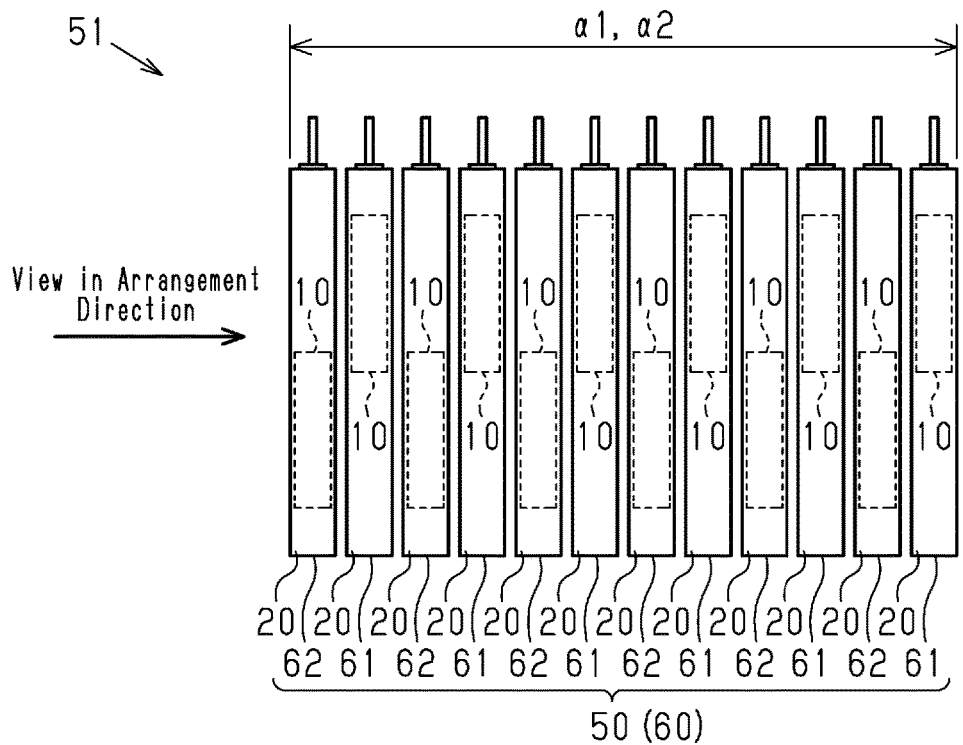
FIG. 5 is a schematic diagram of a battery stack, illustrating cells arranged in a row.
Figure 6:
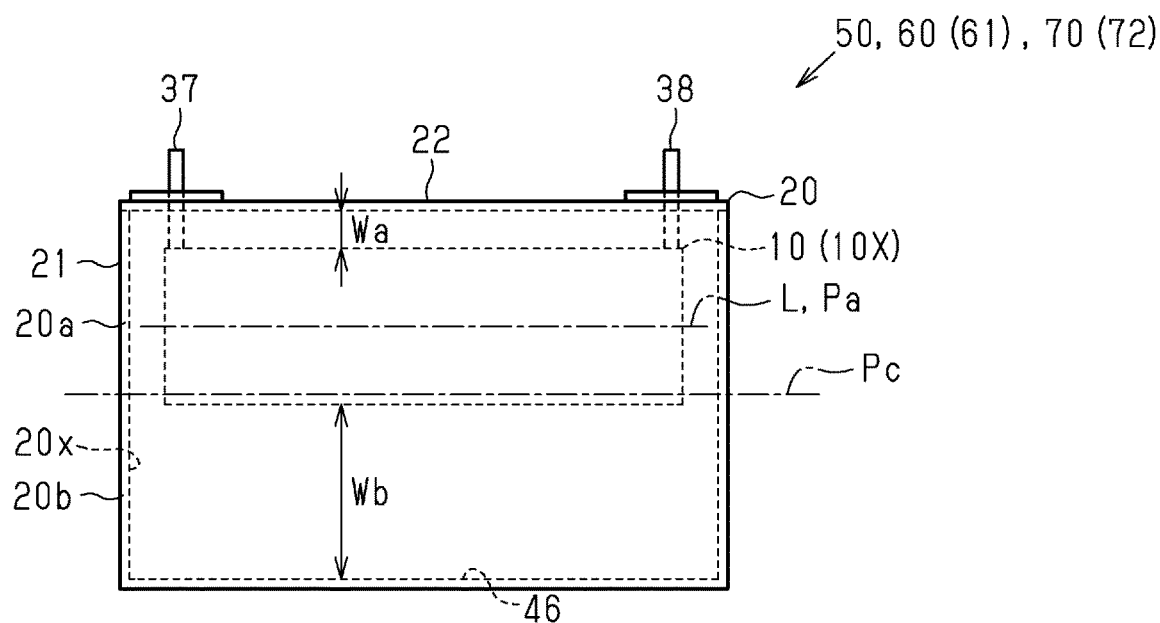
FIG. 6 is a schematic diagram showing an upward-offset cell.
Figure 7:
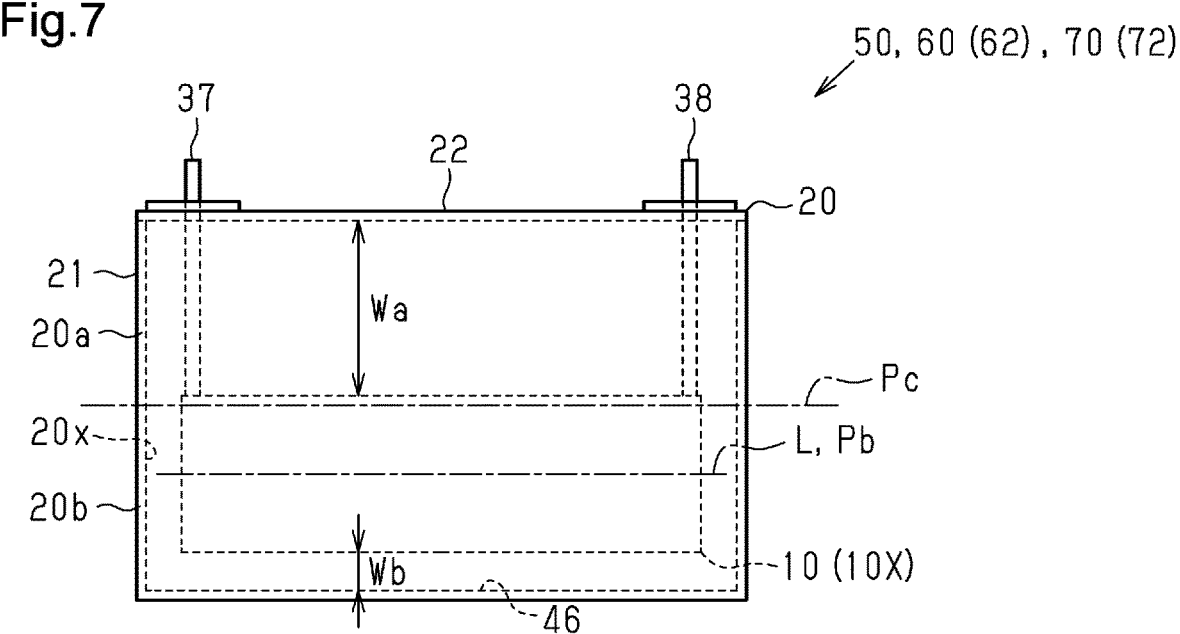
FIG. 7 is a schematic diagram showing a downward-offset cell.

As shown in FIGS. 5 to 7, the battery stack 51 of the present embodiment includes different types of position variation cells 60, in which the positions of the electrode bodies 10 accommodated in the cases 20 are different from each other when viewed in the arrangement direction of the cells 50, which form the battery stack 51. The position variation cell is also referred to an electrode body position variation accommodation cell.

Specifically, the battery stack 51 of the present embodiment includes, as some of the position variation cells 60, upward-offset cells 61, in which the electrode bodies 10 are offset to upper portions 20a of the cases 20. Also, the battery stack 51 includes, as some of the position variation cells 60, downward-offset cells 62, in which the electrode bodies 10 are offset to lower portions 20b of the cases 20. FIG. 5 is a schematic diagram that illustrates only the cells 50, which form the battery stack 51, and the spacers 52, the end plates 53, 53, and the binding members 54, 54 are omitted. The up-down direction in FIGS. 5 to 7 agrees with the up-down direction of the cells 50, which form the battery stack 51. The battery stack 51 of the present embodiment is configured such that the upward-offset cells 61 and the downward-offset cells 62 are arranged alternately in the arrangement direction of the cells 50, which form the battery stack 51.

In other words, as shown in FIG. 5, the entire arrangement of the cells 50 in the battery stack 51 of the present embodiment is in a dissimilarity zone $\alpha1$, in which each adjacent two cells 50 in the arrangement direction are different types of the position variation cells 60. This dissimilarity zone $\alpha1$ has the configuration of an alternation zone $\alpha2$, in which the upward-offset cells 61 and the downward-offset cells 62, which are different types of the position variation cells 60, are arranged alternately in the arrangement direction of the cells 50.

More specifically, the electrode body 10 in the upward-offset cell 61 of the present embodiment is arranged such that its central position in the up-down direction, that is, the rolling axis L of the rolled body 10X, is located above a middle position Pc in the up-down direction in the case 20 as shown in FIG. 6. Further, the electrode body 10 is arranged in the upward-offset cell 61 such that the ratio between a distance Wa to the lid member 22, which is an upper end of an accommodation space 20x defined by the case 20, and a distance Wb to the bottom portion 46, which is a lower end of the accommodation space 20x, is approximately within the range between 1:2 and 1:4, inclusive. The upward-offset cell 61 of the present embodiment is designed such that the space occupancy of the electrode body 10 in the case 20, that is, the volume ratio of the electrode body 10 in the accommodation space 20x, is, for example, less than or equal to 75%.

Also, the electrode body 10 in the downward-offset cell 62 of the present embodiment is arranged such that its central position in the up-down direction, that is, the rolling axis L of the rolled body 10X, is located below the middle position Pc in the up-down direction in the case 20 as shown in FIG. 7. Further, the electrode body 10 is arranged in the downward-offset cell 62 such that the ratio between the distance Wa to the lid member 22, which is the upper end of an accommodation space 20x, and the distance Wb to the bottom portion 46, which is the lower end of the accommodation space 20x, is approximately within the range between 2:1 and 4:1, inclusive. The downward-offset cell 62 of the present embodiment is designed such that the space occupancy of the electrode body 10 in the case 20 is, for example, less than or equal to 75%.

Although not illustrated, the upward-offset cell 61 has a function of taking up the surplus electrolyte solution 44, which is stored in the bottom portion 46 of the case 20, and supplying it to the electrode body 10, which is the rolled body 10X arranged in the upper portion of the case 20. This ensures the battery performance of the cells 50 in the battery stack 51 of the present embodiment irrespective of the types of the position variation cells 60.

Operation of the present embodiment will now be described.

Each upward-offset cell 61 has a heat generating region in an upper part of the case 20, and each downward-offset cell 62 has a heat generating region in a lower part of the case 20. Since the battery stack 51 includes the upward-offset cells 61 and the downward-offset cells 62 as the cells 50, the heat generating regions of the cells 50 are dispersed in the up-down direction when viewed in the arrangement direction. Further, since the upward-offset cells 61 and the downward-offset cells 62 are arranged alternately in the arrangement direction of the cells 50, the heat generating regions of each adjacent two of the cells 50 are displaced from each other in the up-down direction. This improves the heat radiation performance of the battery stack 51.

The present embodiment has the following advantages.

(1) The battery stack 51 is formed by binding the cells 50 arranged in a row. Each cell 50 includes the electrode body 10 accommodated in the case 20. The battery stack 51 includes, as the cells 50, different types of the position variation cells 60, in which the positions of the electrode bodies 10 accommodated in the cases 20 are different from each other when viewed in the arrangement direction of the cells 50.

The cells 50 have different heat generating regions depending on the types of the position variation cells 60, in which the positions of the electrode bodies 10 accommodated in the cases 20 vary. The above-described configuration thus disperses the heat generating regions of the cells 50 when viewed in the arrangement direction of the cells 50. This ensures superior heat radiation performance. In other words, each of the cells 50 in the battery stack 51 has an improved cooling performance for the electrode body 10. This limits reduction in the performance of the cells 50 and ensures superior safety. As a result, the battery performance of the battery stack 51 and the battery performance of a battery pack that includes multiple battery stacks 51 packaged together are ensured in a favorable manner for an extended period of time.

(2) The battery stack 51 has the dissimilarity zone α1, in which each adjacent two of the cells 50 in the arrangement direction are different types of the position variation cells 60.

In the above-described configuration, the heat generating regions of each adjacent two of the cells 50 in the arrangement direction are displaced from each other. This further improves the heat radiation performance.

(3) The battery stack 51 includes, as the position variation cells 60, the upward-offset cells 61, in which the electrode bodies 10 are offset to the upper portions of the cases 20, and the downward-offset cells 62, in which the electrode bodies 10 are offset to the lower portions of the cases 20

Each upward-offset cell 61 has a heat generating region in an upper part of the case 20, and each downward-offset cell 62 has a heat generating region in a lower part of the case 20. The above-described configuration thus disperses the heat generating regions of the cells 50 in the up-down direction when viewed in the arrangement direction. This further improves the heat radiation performance.

(4) In the battery stack 51, the upward-offset cells 61 and the downward-offset cells 62 are arranged alternately in the arrangement direction of the cells 50.

In the above-described configuration, the heat generating regions of each adjacent two of the cells 50 in the arrangement direction are displaced in the up-down direction from each other. This further improves the heat radiation performance.

(5) The cases 20 of the cells 50 have a common shape.

The above-described configuration allows the positions of the electrode bodies 10 accommodated in the cases 20 to be set easily and accurately for each type of the position variation cells 60. In the accommodation space 20x defined by the case 20, an unoccupied area, in which the electrode body 10 is not arranged, that is, a non-heat generating region of each cell 50 can be managed easily. This further improves the heat radiation performance.

For example, the outer shape of the battery stack 51 can be made common for uses in which specifications of the power source such as the charge-discharge capacity and the output voltage are different from each other. This facilitates production management and thus reduces the costs.

(6) Each electrode body 10 has the configuration of the rolled body 10X, in which the positive and negative electrode sheets 35, which are stacked together with the separator 5 between them, are rolled.

The electrode body 10, which has the configuration of the rolled body 10X, is likely to generate heat during charging/discharging. Therefore, the use of the battery stack 51 of the rechargeable battery 1 having the electrode bodies 10 achieves remarkable advantages.

Second Embodiment

A battery stack 51B according to a second embodiment will now be described with reference to the drawings. For illustrative purposes, like or the same reference numerals are given to those components that are like or the same as the corresponding components of the first embodiment and detailed explanations are omitted.

Figure 8:
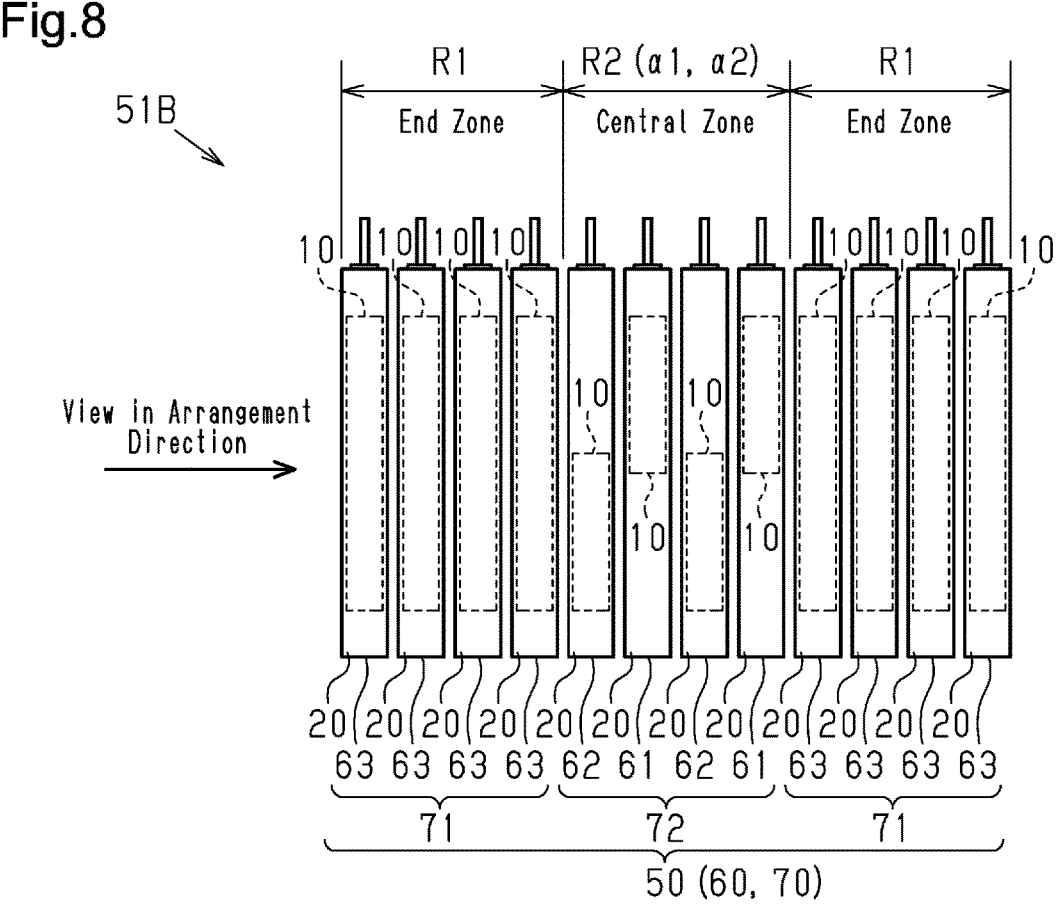
FIG. 8 is a schematic diagram of a battery stack, illustrating an arrangement of cells according to a second embodiment.

As shown in FIG. 8, the battery stack 51B of the present embodiment includes upward-offset cells 61 and downward-offset cells 62 as the position variation cells 60, like the battery stack 51 of the first embodiment. In addition to the upward-offset cell 61 and the downward-offset cell 62, the battery stack 51B includes middle-position cells 63, in which the electrode body 10 is arranged in a middle position in the case 20.

Specifically, as shown in FIG. 3, each middle-position cell 63 of the battery stack 51B of the present embodiment is configured such that the central position in the up-down direction of the electrode body 10, that is, the rolling axis L of the rolled body 10X, is located at the middle position Pc in the up-down direction in the case 20. The electrode body 10 of each middle-position cell 63 is arranged at the middle position Pc, which is at the middle between an upper position Pa, at which the electrode body 10 of each upward-offset cell 61 is arranged, and a lower position Pb, at which the electrode body 10 of each downward-offset cell 62 is arranged (refer to FIGS. 6 and 7).

The middle-position cell 63 of the present embodiment is designed such that the space occupancy of the electrode body 10 in the case 20 is, for example, greater than or equal to 80%. Accordingly, the battery stack 51B of the present embodiment includes multiple types of space-occupancy variation cells 70 as the cells 50 arranged in a row, as shown in FIG. 8. The space occupancies of the electrode bodies 10 in the cases 20 are different from each other among different types of the space-occupancy variation cells 70. The space-occupancy variation cell is also referred to an electrode body space-occupancy variation cell.

As shown in FIGS. 3, 6, and 7, when the space-occupancy variation cells 70 are categorized into different types using the middle-position cells 63 as reference space-occupancy cell 71, the upward-offset cell 61 and the downward-offset cell 62 are categorized as low space-occupancy cells 72, which have relatively low space occupancies of the electrode bodies 10.

When the entire arrangement of the cells 50 in the battery stack 51B of the present embodiment is divided into end zones R1, R1 and a central zone R2, different types of the space-occupancy variation cells 70 are arranged in the respective zones as shown in FIG. 8. In the battery stack 51B of the present embodiment, one third of the cells of the battery stack 51B are arranged in each of the end zones R1, R1 and the central zone R2. Specifically, in the battery stack 51B of the present embodiment, the middle-position cells 63 that have the configuration of the reference space-occupancy cells 71 are arranged in the end zones R1, R1. Further, the upward-offset cell 61 and the downward-offset cell 62, which each have the configuration of the low space-occupancy cell 72, are arranged in the central zone R2. Accordingly, the battery stack 51B of the present embodiment is configured such that the cells 50 in the central zone R2 have the configuration of the space-occupancy variation cells 70, which have lower space occupancies of the electrode bodies 10 than the cells 50 arranged in the end zones R1, R1.

In the cells 50 arranged in a row, the cells 50 arranged in the central zone R2 have a tendency to be heated to higher temperatures than those in the end zones R1, R1. In this regard, the low space-occupancy cell 72, which generate a relatively small amount of heat, are arranged in the central zone R2 of the battery stack 51B of the present embodiment. Further, the reference space-occupancy cells 71, which generate a relatively large amount of heat, are arranged in the end zones R1, R1. The battery stack 51B of the present embodiment thus reduces uneven temperature distribution among the cells 50.

More specifically, the central zone R2 of the battery stack 51B of the present embodiment has the configurations of the dissimilarity zone α1 and the alternation zone α2. That is, in the battery stack 51B of the present embodiment, the upward-offset cells 61 and the downward-offset cells 62 in the central zone R2 are arranged alternately in the arrangement direction of the cells 50. Accordingly, the battery stack 51B of the present embodiment has an improved heat radiation performance in the central zone R2.

As described above, the present embodiment is capable of performing favorable heat management.

(1) The battery stack 51B includes, as the cells 50, multiple types of the space-occupancy variation cells 70, of which the space occupancies of the electrode bodies 10 in the cases 20 are different from each other.

The heat radiation amounts of the respective cells 50 in the battery stack 51B tend to increase as the space occupancy of the electrode body 10 in the case 20 increases. Taking this into consideration, the space-occupancy variation cells 70 of which the space occupancies of the electrode bodies 10 are relatively low are arranged in positions where the cells 50 are easily heated to high temperatures. Also, the space-occupancy variation cells 70 of which the space occupancies of the electrode bodies 10 are relatively high are arranged in positions where the cells 50 are not easily heated to high temperatures. This reduces uneven temperature distribution among the arranged cells 50. As a result, the battery performance of the battery stack 51B and the battery performance of a battery pack that includes multiple battery stacks 51B packaged together are ensured in a favorable manner for an extended period of time.

(2) When the entire arrangement of the cells 50 is divided into the end zones R1, R1 and the central zone R2, the cells 50 in the central zone R2 have the configuration of the space-occupancy variation cells 70, which have lower space occupancies of the electrode bodies 10 than the cells 50 arranged in the end zones R1, R1.

In the cells 50 arranged in a row, the cells 50 arranged in the central zone R2 have a tendency to be heated to higher temperatures than those in the end zones R1, R1. In this respect, the above-described configuration can set a small amount of heat generation for the cells 50 arranged in the central zone R2. This reduces uneven temperature distribution among the arranged cells 50 effectively.

(3) The battery stack 51B includes, as the position variation cells 60, the middle-position cells 63, in addition to the upward-offset cell 61 and the downward-offset cell 62. The electrode body 10 of each middle-position cell 63 is arranged at the middle position Pc, which is at the middle between the upper position Pa, at which the electrode body 10 of each upward-offset cell 61 is arranged, and the lower position Pb, at which the electrode body 10 of each downward-offset cell 62 is arranged.

The above-described configuration includes an increased number of types of the position variation cells 60 so as to improve the heat management. Particularly, the middle-position cells 63 are characterized in that the space occupancy of the electrode bodies 10 can be increased easily as compared to the upward-offset cell 61 and the downward-offset cell 62 since the positions of the electrode bodies 10 in the cases 20 are evenly distributed. This configuration allows the middle-position cells 63, which generate relatively large amounts of heat, to be arranged at positions where the cells 50 are unlikely to be heated to high temperatures. This reduces uneven temperature distribution among the arranged cells 50 effectively.

(4) The battery stack 51B has a configuration in which the middle-position cells 63 are arranged in the end zones R1, R1, and the upward-offset cells 61 the downward-offset cells 62 are arranged in the central zone R2.

The above-described configuration can set a small amount of heat generation for the cells 50 arranged in the central zone R2, which is easily heated to high temperatures. Also, the above-described configuration can set a large amount of heat generation for the cells 50 arranged in the end zones R1, R1, which are not easily heated to high temperatures. This reduces uneven temperature distribution among the arranged cells 50 effectively.

(5) In the battery stack 51B, the upward-offset cells 61 and the downward-offset cells 62 in the central zone R2 are arranged alternately in the arrangement direction of the cells 50.

With the above-described configuration, the upward-offset cell 61 and the downward-offset cell 62 arranged in the central zone R2 form a dissimilarity zone α1 and an alternation zone α2 in the central zone R2. This ensures superior heat radiation performance of the central zone R2. As a result, uneven temperature distribution among the arranged cells 50 is reduced effectively.

Third Embodiment

A battery stack 51C according to a third embodiment will now be described with reference to the drawings. For illustrative purposes, like or the same reference numerals are given to those components that are like or the same as the corresponding components of the second embodiment and detailed explanations are omitted.

Figure 9:
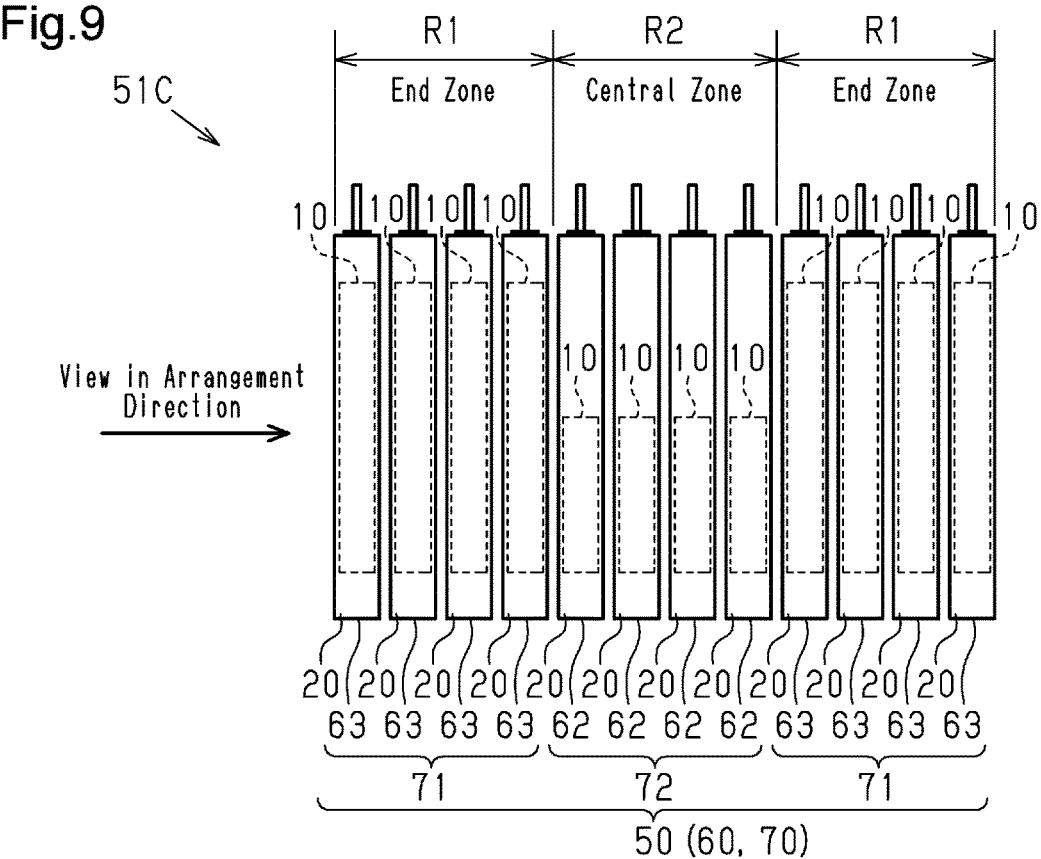
FIG. 9 is a schematic diagram of a battery stack, illustrating an arrangement of cells according to a third embodiment.

As shown in FIG. 9, the battery stack 51C of the present embodiment includes middle-position cells 63 arranged in the end zones R1, R1, like the battery stack 51B of the second embodiment. The middle-position cells 63 each have the configuration of the reference space-occupancy cell 71. In the battery stack 51C of the present embodiment, only the downward-offset cells 62 that have the configuration of the low space-occupancy cells 72 are arranged in the central zone R2.

That is, in the battery stack 51C of the present embodiment, the cells 50 in the central zone R2 have the configuration of the space-occupancy variation cells 70, which have lower space occupancies of the electrode bodies 10 than the cells 50 arranged in the end zones R1, R1. The battery stack 51C of the present embodiment is different from the battery stack 51B of the second embodiment in that the central zone R2 is neither the dissimilarity zone α1 nor the alternation zone α2.

The battery stack 51C of the present embodiment is characterized in that the electrode bodies 10 of the downward-offset cells 62 arranged in the central zone R2 are easily impregnated with the surplus electrolyte solution 44, which is stored in the bottom portion 46 of the case 20 (refer to FIG. 3). Thus, the battery stack 51C is superior in the cooling performance for the electrode bodies 10 accommodated in the cases 20 as compared to the upward-offset cell 61 or the middle-position cells 63. Accordingly, the battery stack 51C of the present embodiment has an improved heat radiation performance in the central zone R2.

The configuration of the present embodiment reduces uneven temperature distribution among the arranged cells 50 effectively.

The above-described embodiments may be modified as follows. The above-described embodiments and the following modifications can be combined as long as the combined modifications remain technically consistent with each other.

In the above-described embodiments, the number of the cells 50, which form the battery stack 51, may be changed. In the second and third embodiments, the number of the cells 50 distributed to the end zones R1, R1 and the number of the cells 50 distributed to the central zone R3 may be changed.

In the above-described embodiments, the position variation cells 60 include the upward-offset cell 61, the downward-offset cell 62, and the middle-position cells 63. Further, in the second and third embodiments, the upward-offset cell 61 and the downward-offset cell 62 include the low space-occupancy cell 72 as the space-occupancy variation cells 70. The middle-position cells 63 are the reference space-occupancy cells 71 that have a higher space occupancy of the electrode bodies 10 than the low space-occupancy cells 72.

Figure 10:
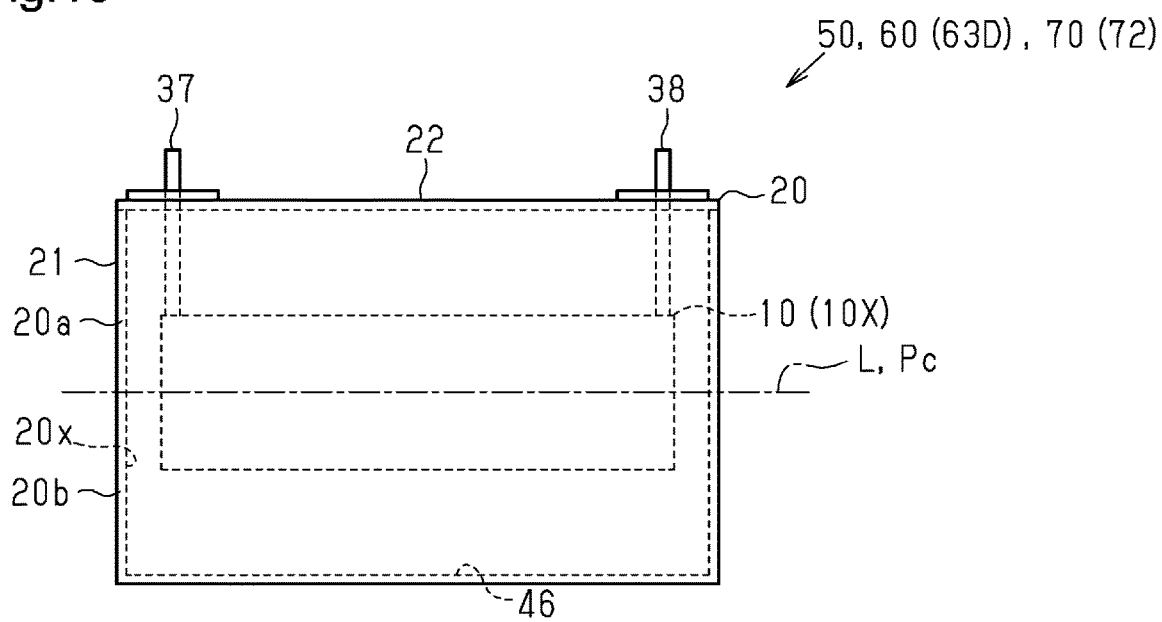
FIG. 10 is a schematic diagram showing a position variation cell according to a modification.
Figure 11:
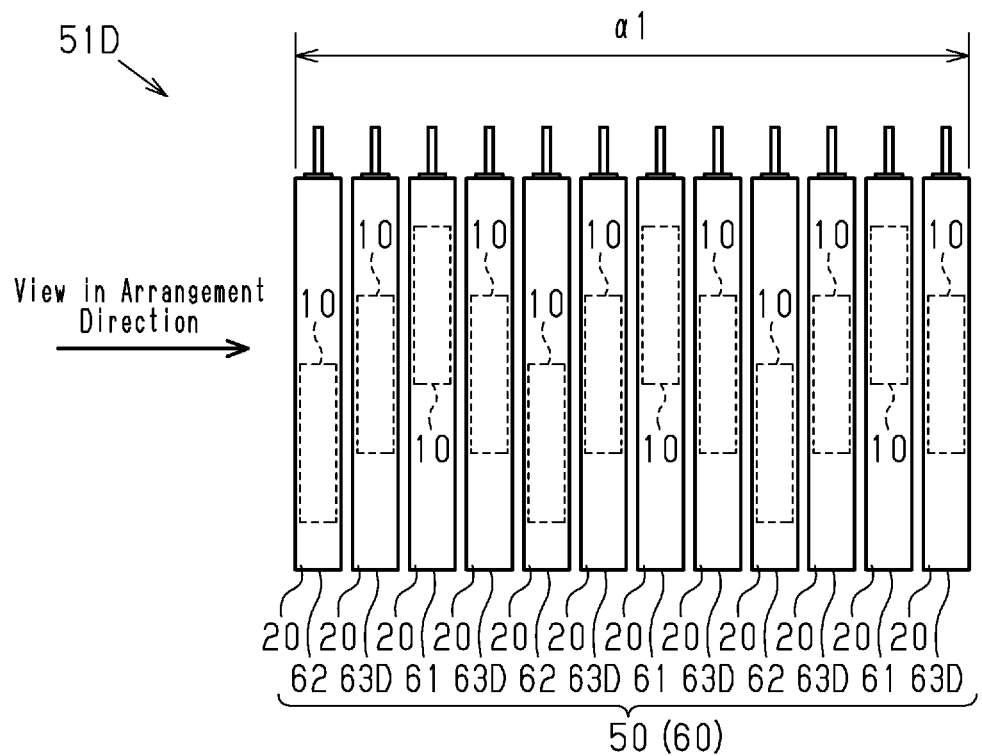
FIG. 11 is a schematic diagram of a battery stack, illustrating an arrangement of cells according to a modification.

However, the present disclosure is not limited this. For example, as shown in FIGS. 10 and 11, a battery stack 51D may be employed that includes middle-position cells 63D, which have the configuration of the low space-occupancy cells 72. In this case also, the space occupancy of the electrode body 10 in the case 20 is preferably less than or equal to 75%. The middle-position cells 63D may be included in the dissimilarity zone α1, in which each adjacent two of the cells 50 the arrangement direction are different types of the position variation cells 60.

The dissimilarity zone α1 does not necessarily need to be the alternation zone α2. The pattern of arrangement of each adjacent two of the cells 50 in the arrangement direction, which serve as the position variation cells 60, may be changed. In the dissimilarity zone α1, the types of the position variation cells 60 of each adjacent two of the cells 50 in the arrangement direction may be randomly different.

As exemplified by the relationship between the middle-position cells 63 in the second and third embodiments and the middle-position cells 63D of one of the previous modifications, the upward-offset cells 61 and the downward-offset cells 62 may include multiple types of the space-occupancy variation cells 70 having different space occupancies.

In the third embodiment, the central zone R2 includes only the downward-offset cells 62. However, the present disclosure is not limited to this. For example, the central zone R2 may include only the upward-offset cell 61 or only the middle-position cells 63D that have the configuration of the low space-occupancy cell 72 as in one of the above-described modifications. This configuration also achieves the same advantages as the above-described embodiments.

The above-described embodiments and modifications describe the upward-offset cell 61, the downward-offset cell 62, and the middle-position cells 63, 63D, in which the electrode bodies 10 accommodated in the cases 20 as the position variation cells 60 are different in the up-down direction when viewed in the arrangement direction of the cells 50.

Figure 12:
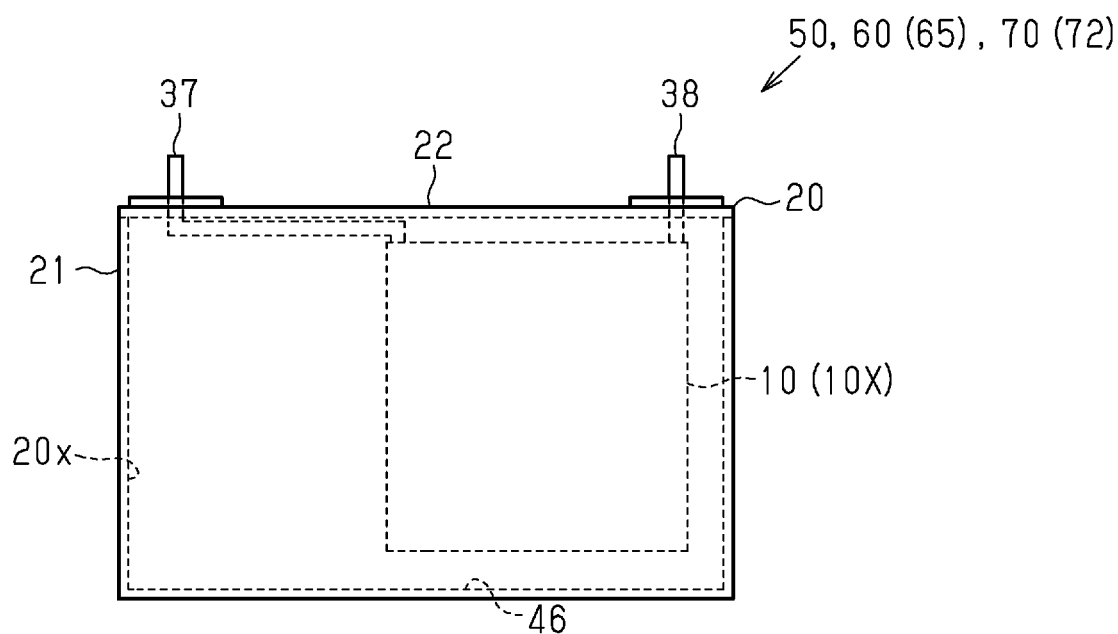
FIG. 12 is a schematic diagram showing a position variation cell according to a modification.

However, the present disclosure is not limited this. For example, as shown in FIG. 12, the position variation cells 60 may include laterally-offset cells 65, in which the electrode bodies 10 accommodated in the cases 20 are displaced in the lateral direction when viewed in the arrangement direction of the cells 50. The laterally-offset cells 65 may have a configuration different from that shown in FIG. 12. For example, the direction in which the electrode bodies 10 are displaced may vary in the lateral direction. Specifically, the electrode body 10 is displaced rightward in the example of FIG. 12. The electrode body 10 may be displaced leftward. The middle-position cells 63, which have the configuration of the low space-occupancy cells 72, may have the configuration similar to the laterally-offset cells 65.

The number of types of the position variation cells 60 in each battery stack 51 may be changed. For example, three or more types of the position variation cells 60 may be provided. Also, the number of types of the space-occupancy variation cells 70 may be changed.

In the above-described embodiments, the rechargeable battery 1, which forms the battery stack 51, has a configuration as a lithium-ion rechargeable battery. Each electrode body 10 has the configuration of the rolled body 10X, in which the positive and negative electrode sheets 35, which are stacked together with the separator 5 between them, are rolled.

However, the present disclosure is not limited to this. The type of the rechargeable battery 1, which forms the battery stack 51, may be changed. For example, a nickel metal hydride rechargeable battery may be employed. That is, the type of the rechargeable battery 1 is not limited to non-aqueous rechargeable battery. Also, the electrode body 10 does not necessarily need to have the configuration of the rolled body 10X.

In the above-described embodiments, the battery stack 51 includes, as the cells 50, different types of the position variation cells 60, in which the positions of the electrode bodies 10 accommodated in the cases 20 are different from each other when viewed in the arrangement direction of the cells 50. However, the present disclosure is not limited to this. Regardless of the types of the position variation cells 60, the cells 50 may include different types of the space-occupancy variation cells 70 having different space occupancies of the electrode bodies 10 in the cases 20.

In the above-described embodiments, the cases 20 of the cells 50 have a common shape. However, the present disclosure is not limited to this. For example, the cases 20 may have different shapes depending on the types of the position variation cells 60 or the types of the space-occupancy variation cells 70. However, since the cells 50 arranged in a row needs to be bound together, differences in the shape are preferably small.

A technical concept obtained from the above-described embodiments and the modifications will now be described.

(a) A battery stack comprising cells, the cells being arranged in a row and bound together, wherein
- each of the cells includes a case and an electrode body accommodated in the case, and
- the cells include multiple types of space-occupancy variation cells of which space occupancies of the electrode bodies in the cases are different.

The heat radiation amounts of the respective cells in the battery stack tend to increase as the space occupancy of the electrode body in the case increases. Taking this into consideration, the space-occupancy variation cells of which the space occupancies of the electrode bodies are relatively low are arranged in positions where the cells are easily heated to high temperatures. Also, the space-occupancy variation cells of which the space occupancies of the electrode bodies are relatively high are arranged in positions where the cells are not easily heated to high temperatures. This reduces uneven temperature distribution among the arranged cells. As a result, the battery performance of the battery stack and the battery performance of a battery pack that includes multiple battery stacks packaged together are ensured in a favorable manner for an extended period of time.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A battery stack comprising cells, the cells being arranged in a row and bound together, wherein:
   - each of the cells includes a case and an electrode body accommodated in the case, and
   - the cells include multiple types of position variation cells, in which positions of electrode bodies of the cells are different from each other when the cells are viewed in an arrangement direction of the cells,
   wherein:
   - the position variation cells include at least one of an upward-offset cell, in which the electrode body is offset to an upper portion of the case, and a downward-offset cell, in which the electrode body is offset to a lower portion of the case,
   - a space occupancy of the electrode body in the case of the upward-offset cell is less than or equal to 75%,
   - a space occupancy of the electrode body in the case of the downward-offset cell is less than or equal to 75%, and
   - the cases of the cells have the same shape with identical dimensions.

2. The battery stack according to claim 1, including a dissimilarity zone, in which each adjacent two of the cells in the arrangement direction are different types of the position variation cells.

3. The battery stack according to claim 2, wherein
   - an entire arrangement of the cells is divided into an end zone and a central zone, and
   - the dissimilarity zone is provided in the central zone.

4. The battery stack according to claim 1, wherein the cells include multiple types of space-occupancy variation cells of which space occupancies of the electrode bodies in the cases are different from each other.

5. The battery stack according to claim 4, wherein
   - an entire arrangement of the cells is divided into an end zone and a central zone, and
   - the cells in the central zone have a configuration of the space-occupancy variation cells, which have lower space occupancies than the cells arranged in the end zone.

6. The battery stack according to claim 1, wherein the position variation cells include a middle-position cell, the electrode body of the middle-position cell being arranged at a middle position, the middle position being at a middle between an upper position, at which the electrode body of the upward-offset cell is arranged, and a lower position, at which the electrode body of the downward-offset cell is arranged.

7. The battery stack according to claim 6, wherein
   - an entire arrangement of the cells is divided into an end zone and a central zone, and
   - the middle-position cell is arranged in the end zone, and at least one of the upward-offset cell and the downward-offset cell is arranged in the central zone.

8. The battery stack according to claim 1, including an alternation zone, in which the upward-offset cell and the downward-offset cell are arranged alternately.

9. The battery stack according to claim 1, wherein the electrode body include a configuration of a rolled body, the rolled body being formed by rolling positive and negative electrode sheets, which are stacked together with a separator between the positive and negative electrode sheets.

* * * * *